United States Patent Office 2,946,932
Patented July 26, 1960

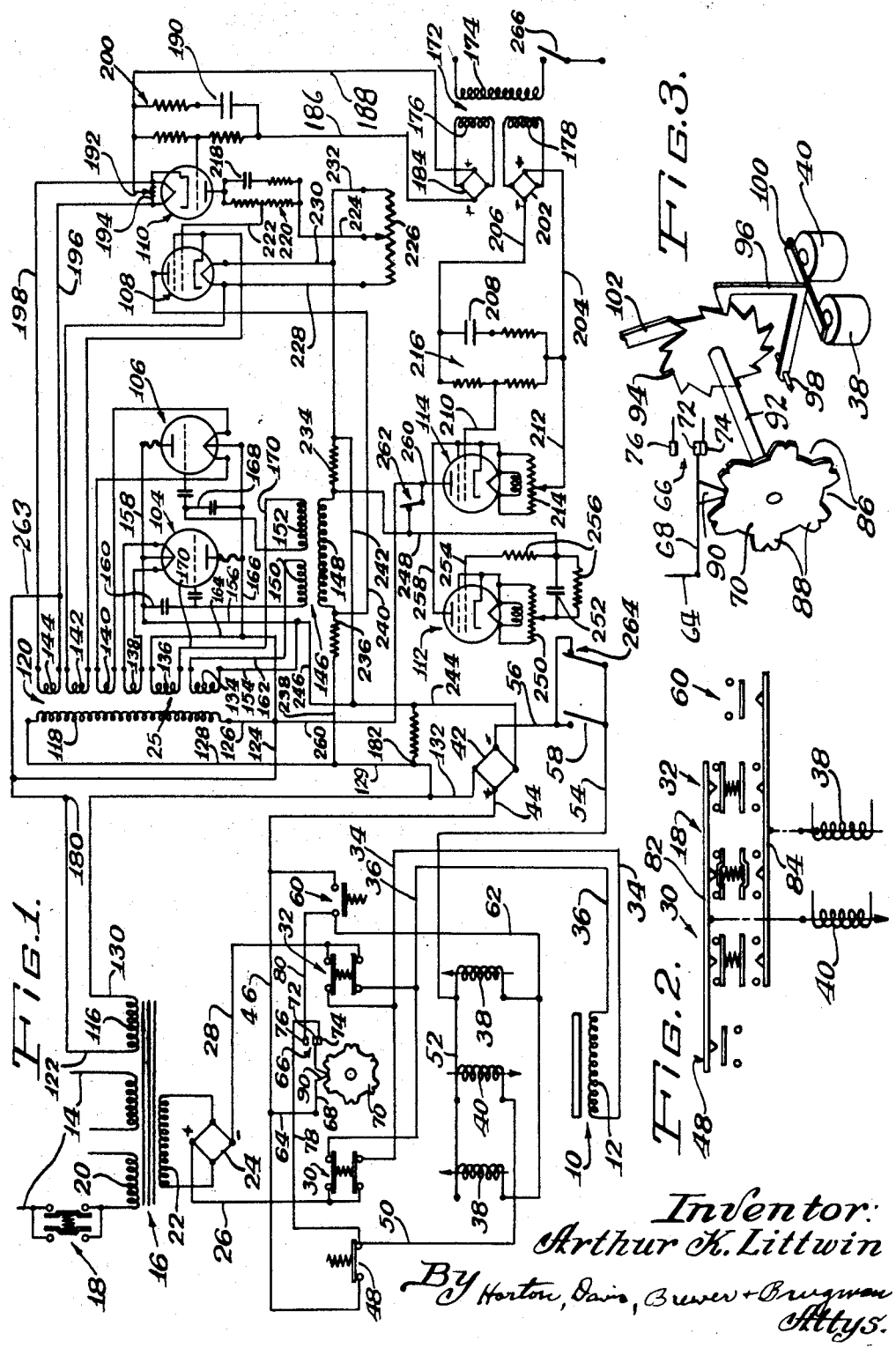

2,946,932

DEMAGNETIZING APPARATUS

Arthur K. Littwin, Lincolnwood, Ill., assignor, by mesne assignments, to Robert L. Littwin, Arthur K. Littwin, and Louis W. Bier, Chicago, Ill., as trustees Filed Aug. 30, 1957, Ser. No. 681,412

13 Claims. (Cl. 317—157.5)

The present invention relates to demagnetizing an electromagnet.

The invention has particular adaptability to use in magnetic chucks for holding a work piece in position while a working operation is being performed thereon. For example, in an operation of grinding, drilling, or similar operation on a work piece by a machine tool, the work piece is held in the intended position by a magnetic chuck. The chuck in such cases includes an electromagnet that is magnetized by direct current, and when the operation performed thereon is completed, and the electromagnet is turned off, the residual magnetism in the chuck is so great that it is extremely difficult if not impossible to remove the work piece, particularly in the case where the chuck and the work piece are massive. To facilitate removal of the work piece, the chuck and the work piece are demagnetized, and this is done by reversing the polarity of the magnetizing current alternately a number of times until the residual magnetism is at a minimum. This may be accomplished by retaining the successive intervals in which the polarity is so alternately reversed of uniform length and diminishing the voltage in successive intervals, or reducing the length of the time intervals while maintaining the voltage constant.

Mechanisms have been known heretofore for accomplishing demagnetization, but the apparatus of the present invention achieves the desired result more quickly and accurately than has been possible heretofore.

The present invention utilizes electronic tube means for controlling the reversal of the direct current imposed on the chuck, with consequent greater range of demagnetization, since the time between successive periods of reversal is virtually eliminated.

A further advantage of the invention is that greater accuracy in demagnetization is achieved in that there is no wear in the timing control elements such as would affect the timing of the periods of reversal, as often occurs in mechanical contrivances through wear of parts.

Other objects and advantages of the invention will appear from the following detail description taken in conjunction with the accompanying drawing, in which:

Figure 1 is a diagram of the circuit utilized in the apparatus;

Fig. 2 is a diagrammatic view of certain switch means used in the apparatus and included in the diagram of Fig. 1; and Fig. 3 is a diagrammatic illustration of a cam means and means for actuating it, included in the diagram of Fig. 1.

The apparatus of the invention as described hereinbelow may be embodied in any desired mechanical and physical arrangement, as will be understood. For example, a machine tool of a kind in which it may be embodied is disclosed in my copending application, Serial No. 650,023, filed April 1, 1957. A magnetic chuck indicated at 10 is utilized for retaining a work piece thereon in a machine tool such as a boring machine, milling machine, etc., as disclosed in said copending application. The chuck includes an electromagnet 12 which when energized holds the work piece thereon for the operation to be performed on the work piece such as grinding, drilling, etc. When it is desired to remove the work piece the electromagnet 12 is de-energized, and under the control of the apparatus of the present invention it is demagnetized so as to remove the magnetism, or the greater portion thereof, leaving only a minor amount of residual magnetism therein.

The source of electricity for the magnetic chuck 10 as well as all of the control elements referred to hereinbelow may be derived from an A.C. circuit 14 leading to a transformer 16. The circuit 14 may be, for example, a source of 230 volts, 460 volts, etc. Interposed in the circuit or line 14 is a switch means 18 referred to hereinbelow in detail, the purpose of which is to interrupt the A.C. circuit 14 in the operation of reversing the polarity of the direct current transmitted to the magnetic chuck 10.

The transformer 16 includes a primary 20, and a secondary 22 which is connected across a rectifier 24, referred to herein as a power rectifier, which provides the current to the magnetic chuck 10. Leading from the rectifier 24 are conductors 26 and 28 connected through reversing switches 30 and 32, respectively, which in turn are connected with conductors 34 and 36, the particular ones of the latter conductors which are connected depending on the position of the switches, these conductors being connected with the electromagnet 12 of the magnetic chuck.

The means for actuating the switches 18, 30 and 32, and other switches, to be referred to hereinbelow, includes solenoids 38 and 40, the solenoid 38 including in the present instance and for convenience, two separate solenoid elements, while the solenoid 40 may be a single unit. The solenoid elements 38 are connected for conjoint operation in the same sense. Direct current for actuating the solenoids 38 and 40 is derived from a rectifier 42 which in turn derives its current through control apparatus and in a manner to be described hereinbelow. The circuitry leading from the rectifier 42 to the solenoids 38 and 40, and associated instrumentalities is as follows: A conductor 44 leads from one side of the rectifier, e.g., the positive side, to a conductor 46 which is connected through a switch 48 and another conductor 50 with the solenoid 40. The return from the solenoid 40 is by means of a conductor 52, conductor 54, and conductor 56 to the opposite or negative side of the rectifier 42. A switch 58 is interposed between the conductors 54 and 56, as will be described more fully hereinbelow.

The conductor 46 also leads to switch means 60, and through the latter to conductor 62 connected with the solenoids 38. The return from the solenoid 38 to the opposite side of the rectifier is through the common or return conductor 52 in the same manner as described above in connection with the solenoid 40.

Also connected with the conductor 46 is another conductor 64 leading to switch means 66, the switch means being controlled through an arm 68 pivoted for movement and control by a cam 70. The switch arm 68 serves as a conductor, being connected with the conductor 64 and includes a common contact 72 connected thereto and movable between contacts 74 and 76. The contact 74 is connected through conductor 78 with the conductor 50, while the contact 76 is connected through conductor 80 with the conductor 62.

Fig. 2 illustrates diagrammatically a suitable physical arrangement of the switches referred to, and the manner of their actuation. The switch 18 in the A.C. line is included in an arrangement with the other switches referred to, namely, 30, 32, 48 and 60, for certain operation in relation thereto. These switch means are of conventional character and are arranged for actuation in certain timed relation. Connected with the armature of the solenoid 40 is a bar 82 arranged for gang operation of the switches 48, 30, 18 and 32. Upon energization of the solenoid 40 the armature is moved in a given direction which in the diagram utilized is in downward direction. Upon downward movement of the bar 82 the switch 18 is opened at its upper contacts, and in the initial portion of the movement the lower contact remains open. The shape of the elements of the switch 18 is such that this switch opens before the switches 30 and 32 are opened, as will be evident from the illustration. Upon continued movement of the bar 82, and after opening of the upper contacts of that switch, the upper contacts of the switches 30 and 32 are opened. Upon still further movement of the bar 82 the lower contacts of the switches 30 and 32 are closed, and still later, the lower contacts of the switch 18 are closed. During the course of the downward movement of the bar 82 the switch 48 is closed. The switch 18, being in the A.C. circuit, is opened before the reversing switches 30 and 32 are opened, and the latter are closed before the switch 18 is closed, thus eliminating arcing at the switches 30 and 32 in the D.C. circuit.

Upon reverse movement the action is similar but in an opposite direction. The reverse movement is accomplished by movement of the armature of the solenoid 38 transmitted through the bar 84. The bar 84 actuates the switch 60 as well as the switches 30, 18 and 32. A switch arrangement and actuation thereof similar to that just referred to is disclosed and claimed in my above mentioned copending application. In that copending application the switch control operation is effected by means of a mechanical apparatus, while in the present instance the control is effected by electronic means.

The respective positions of the reversing switches 30 and 32 effect a reversal of polarity of the direct current transmitted to the electromagnet 12 of the magnetic chuck. For example, with the reversing switchs 30 and 32 in their upper position, as illustrated in Fig. 2, the circuit from the power rectifier 24 to the electromagnet of the magnetic chuck is as follows: Conductor 26 from the positive side of the rectifier through the upper contacts of the switch 30, conductor 36 to the electromagnet and, in return, through the conductor 34, the upper contacts of switch 32 to the conductor 28 and thus to the negative side of the rectifier. With the switches 30 and 32 in the opposite position, namely, with the lower contacts of the switches closed, the circuit between the power rectifier 24 and electromagnet is as follows: Conductor 26 from the positive side of the rectifier, the lower contacts of the switch 30, conductor 34 to the electromagnet, and in return, through the conductor 36, the lower contacts of the switch 32 and conductor 28 to the negative side of the rectifier.

The reversing operation of the switch means 30 and 32 and thus the reversal of the polarity of the direct current transmitted to the magnetic chuck is accomplished through control pulses delivered from the rectifier 42. These pulses are established under the control of the electronic control means referred to above and described in detail hereinbelow, and in response to the successive pulses the reversing switches 30 and 32, through the medium of the solenoids 38 and 40, are actuated, with consequent transmission of direct current to the magnetic chuck. The arrangement includes alternate stable positions of the reversing switches, the switches being moved to their respective opposite positions in response to successive pulses transmitted from the rectifier 42. The means for effecting this reversing operation includes the cam 70 and actuation thereof by means of the solenoids 38 and 40. The cam 70 includes lobes 88 with depressions or recesses 86 therebetween for cooperation with a projection 90 on the switch arm 68. Upon rotation of the cam 70 the projection 90 rides on the cam, falling into the recesses alternately with riding up on the outer surfaces of the lobes 86. When the projection 90 is in a recess the contact 72 engages the contact 74, closing circuit in one direction, while, when the projection 90 is engaged with the outer surface of one of the lobes, the contact 72 is in engagement with the contact 76, closing circuit in another direction. The cam 70 is arranged for step-by-step movement, each step being equivalent to the spacing between a depression and a lobe, i.e., in one position of the cam the projection 90 extends into the depression and in the position of the next step, the projection 90 engages a lobe 86. The movement of the cam is under the control of the solenoids 38 and 40 and the specific means for accomplishing the rotation of the cam may be as desired such, for example, as that indicated diagrammatically in Fig. 3. The cam 70 may be mounted on a shaft 92 on which also is secured a ratchet wheel 94. The ratchet wheel is moved in step-by-step fashion by a pawl or hook 96 pivotally mounted at 98 and having a transverse arm or bar 100 secured thereto and arranged for acting as an armature to both solenoids 38 and 40. Pursuant to energization of either of the solenoids 38 or 40, the pawl 96 is retracted or drawn downwardly, moving the ratchet wheel 94 one step. A pawl 102 is pivotally mounted at a convenient location and arranged for engaging the teeth of the ratchet wheel to prevent retrograde movement thereof, in a known manner.

The cam 70 is actuated or moved one step in response to each pulse that is transmitted from the rectifier 42, which is a control pulse provided by the electronic control means. When a pulse is transmitted from the rectifier 42 it is delivered to either the solenoids 38 or 40, and in either case the ratchet wheel 94 and cam 70 are moved one step. Depending upon which solenoid is actuated, which in turn is determined by the condition of the circuit under control of the switch means 66, determines whether the cam 70 is moved from a position with the projection 90 in a depression to a position in which it is disposed on one of the lobes, or vice versa. Assuming first a condition as indicated in Fig. 1 with the projection 90 in a recess 88, the switch means 66 is closed between contacts 72 and 74. In response to a pulse being delivered from the rectifier 42, such pulse is conducted through conductors 44, 46 and 64, arm 68, conductor 78 and conductor 50 to the solenoid 40. The latter, upon energization and acting through the mechanism illustrated in Fig. 3, moves the cam 70 one step to a position in which the projection 90 is in engagement with one of the lobes, in consequence of which the switch contact 72 is moved to engage the contact 76. A holding circuit is established by this operation, through the switch 48, i.e., upon energization of the solenoid 40, and as indicated in Fig. 2, the switch 48 is closed and a holding circuit is established through conductors 44, 46, switch 48, conductor 50 to the solenoid 40.

Upon the switch means 66 being moved to its opposite position as just described, namely, with the contacts 72 and 76 in engagement, a circuit is closed through the conductors 44, 46 and 64, through the switch arm 68 and switch means 66 to the conductor 80 and conductor 62 to the solenoid 38. The action of solenoid 38, however, is insufficient to overcome the attractive power of the solenoid 40 and no movement of the switch means at this time is effected. However, in this operation and in response to energization of the solenoid 40, the A.C. circuit is interrupted and the reversing switches 30 and 32 are actuated, and the A.C. circuit is again closed as was explained above in connection with the description of Fig. 2. Energization of the solenoid 40, through the pawl 96, advances the ratchet wheel 94 one step, and the contact 72 is moved into engagement with the contact 76, closing the circuit to the solenoid 38 for the next pulse. When the next pulse is transmitted from the rectifier 42, it is transmitted through the conductors 44, 46 and 64, switch arm 68, switch contacts 72 and 76, conductor 80 and conductor 62 to the solenoid 38. This actuates the A.C. circuit switch 18 and the reversing switches 30 and 32 precisely as described above, but in the opposite direction and the cam 70 is advanced one step. Upon energization of the solenoid 38, the switch 60 is also closed for establishing a holding circuit, and upon cessation of the previous pulse energizing the solenoid 40, the holding circuit switch 48 is permitted to open.

Thus, an arrangement is provided for actuating the switches in response to each pulse transmitted from the rectifier 42, the various elements being alternately positioned, by the successive pulse.

It will be understood that while the switches 30 and 32, and the switch 18, are closed, direct current is transmitted to the electromagnet 12 of the magnetic chuck 10. Upon each pulse that is transmitted, the polarity is reversed, through the reversing switches 30 and 32, and a demagnetizing effect is produced in the electromagnet. The periods of reversal diminish in time at each successive interval of reversal, as described fully hereinbelow. The voltage applied to the electromagnet 12 remains constant, however, throughout the demagnetizing cycle, in the preferred form of the invention, but it is within the scope of the invention to provide for reduction of the voltage in successive intervals.

Attention is next directed to the electronic control means for controlling the pulses delivered to the reversing means described above, through the rectifier 42. The electronic tube control means includes electronic tubes 104, 106, 108, 110, 112 and 114. The circuit includes a secondary winding 116 of the transformer 16. Connected with this secondary is another winding 118 constituting the primary of a transformer 120. The winding 118 is connected with the secondary 116 by means of conductors 122, 124 and 126 on one side and conductors 128, 129 and 130 on the other. A conductor 132 is connected between the secondary 116 and one A.C. point on the rectifier 42.

In the transformer 120 are secondary winding 134, 136, 138, 140, 142 and 144. The first two of these are connected with the grids of the tubes 104 and 106, for imposing negative bias thereon, while the other four, 138, 140, 142 and 144, are connected with the filaments of the tubes 104, 106, 108 and 110, respectively. Associated with the tubes 104 and 106, as well as other elements of the circuit, is a third transformer 146 which includes a primary 148 and secondaries 150 and 152. The two tubes 104 and 106 are arranged in opposite and full phase rectifying arrangement, and the secondaries 134 and 136 are arranged for normally imposing negative bias on the tubes, in alternate intervals. The secondary 134 is connected through conductors 154, 156 and 158 to the filament of the tube 104 and plate of the tube 106. A conductor 160 leads from the conductor 158 to the grid of the tube 104 and to the secondary 150, and through conductor 162 to the opposite side of the secondary 134. The secondary 136 is connected through conductor 164 and conductor 166 to the plate of the tube 104 and the filament of the tube 106. A conductor 168 is connected with conductor 166 and leads to the grid of the tube 106 and the secondary 152; finally, a conductor 170 leads from the opposite side of the secondary 152 to the side of the secondary 136 opposite the conductor 164. The transformer 146, among other functions, provides for imposing positive bias on the tubes 104 and 106 for maintaining them in conducting condition through certain intervals. The bias provided by the secondaries 150 and 152 on the tubes is counter to that provided by the secondaries 134 and 136. The positive bias thus provided is of greater value than that provided by the secondaries 134 and 136, and of desired value to maintain the intended conducting condition.

Another transformer indicated in its entirety at 172 is provided, and includes a primary 174 and secondaries 176 and 178. The primary 174 may be connected at any desired point for providing the desired voltage such, for example, 115 volts A.C., similar to that provided by the secondary 116. In fact, the winding 174 may be connected across the conductors 122 and 130, e.g., at points 180 and 182.

The secondary 176 leads to a rectifier 184, across the D.C. points of which are connected conductors 186 and 188. Connected across these conductors is a condenser 190 and in parallel with the condenser are conductors for imposing positive bias on the tube 110. One of the lines is connected with the grid of the tube while the other is connected with a contact 192 in a resistance 194 connected across the conductors 196 and 198 leading from the secondary 144 to the filament of the tube. Resistances 200 are interposed in the circuit in the usual manner. The secondary 144 normally imposes a negative non-conducting bias on the tube but the condenser 190 upon discharging imposes a positive bias thereon and renders the tube conducting throughout a certain interval.

The secondary 178 of the transformer 172 is connected to a rectifier 202 across the D.C. points of which are conductors 204 and 206 across which is connected a condenser 208. The condenser 208 is arranged for imposing a positive conducting bias on the tube 114, one conductor 210 being connected with the grid of the tube and another conductor 212 having connection with a variable resistance to the filament. Suitable resistances 216 are interposed in the circuit.

Connected with the plate of the tube 110 is a condenser 218 connected in circuit with suitable resistances 220 for imposing a positive conducting bias on the tube 108. One conductor leading from this circuit portion, as indicated at 222, leads to the grid of the tube 108 while another conductor 224 is connected with a potentiometer resistance 226. Connected with the latter is a conductor 228 leading to the filament of the tube 108, from the opposite end of which is a conductor 230 connected with a conductor 232 which in turn is connected with the opposite end of the resistance 226 and with another resistance 234, and through the latter to the primary 148 of the transformer 146. Leading from the opposite end of the primary 148 is a resistance 236 connected in a conductor 238 which is connected through conductor 129 with the conductor 130, the latter, as mentioned above, being connected with the secondary 116. Connected between the primary 148 and resistance 236, is a conductor 240 which is also connected with the plate of the tube 108.

A conductor 242 is connected with the conductor 232 and leads to conductor 244 which is connected to an A.C. point of the rectifier 42, opposite the conductor 132. Leading from the conductor 244 in the opposite direction is a conductor 246 connected with the conductor 156.

The tubes 112 and 114 are connected in circuit as follows: A conductor 248 is connected between the resistance 234 and primary 148 and leads to the tube 112 where it is connected with a potentiometer 250. A condenser 252 is provided in this conductor for imposing a positive conducting bias on the tube 112, having a conductor 254 leading to the grid of the tube, resistances 256 also being provided in the circuit portion. Leading from the plate of the tube 112 is a further conductor 258 connected with the filament and grid of the tube 114. Leading from the plate of the tube 114 is a conductor 260 which is connected with the conductor 124 and thus returns to the secondary 116. Starting switch means 262 is connected across the conductors 248 and 260.

A further conductor 263 is connected with the conductor 122 and leads to the conductor 196 and to the filament of the tube 110.

A switch 264 is connected in parallel with the switch 58 referred to above and arranged in tandem with a control switch 266 which may be interposed in the line such as in one of the conductors 122 and 130 leading to the transformer 172 as well as other elements of the circuit. The switches 266, 264 and 58 are arranged in gang so that is response to closing the main control switch 266, the switch 264 is opened and the switch 58 is closed. Thus, when the apparatus is intended to be put into operation, the switch 266 is closed, as by a manual operation and the switch 58 is thereby also closed. The switches are thus left in such position throughout the demagnetizing cycle. The switch 264 is provided for the purpose of disconnecting the chuck without putting it through the demagnetizing cycle, for enabling for example, a piece to be removed from the chuck for testing it, it being replaced and perhaps other working operations performed thereon, after which the chuck may be put through the demagnetizing cycle.

In response to energization of the transformer 172 the secondary 176 thereof provides direct current through the rectifier 184 and conductors 186 and 188. The condenser 190 charges in consequence thereof, and upon discharge thereof, the positive bias is imposed on the tube 110 and causes it to assume a conductive condition. The discharge is controlled through the potentiometer 194, determining the length of the pulse transmitted in the demagnetizing operation, in conjunction with the potentiometer 226. An A.C. negative bias is constantly imposed on the tube which renders the tube normally nonconducting, and in the absence of the positive bias imposed by means of the condenser 190. Similarly, energization of the secondary 178 establishes a direct current through the rectifier 202 and the conductors 204 and 206. A normally negative non-conducting bias is imposed on the tube 114, and in response to the establishment of the direct current as referred to the condenser 208 becomes charged and upon subsequent discharge thereof, a positive conducting bias is imposed on the tube 114, in opposition to the fixed variable bias through the potentiometer 214. Upon discharge of the condensers 190 and 208, the two tubes 110 and 114 become conducting. The setting of the potentiometer 194 and consequent control of the bias imposed on the tube, in conjunction with the potentiometer 226, control of the length of the pulse transmitted through the tube, and consequent length of the pulses in the demagnetizing cycle.

The secondaries 134 and 136 of the transformer 120 normally maintain constant negative bias on the tubes 104 and 106 to render them non-conducting. The bias is so imposed on respective tubes at each half cycle, respectively, in opposition to the flow of current through the tubes in the respective direction in those half cycles.

While the tube 110 is conducting, the condenser 218 becomes charged and imposes a negative bias on the tube 108 and maintains the latter in non-conducting condition. The negative bias thus provided is in opposition to that as controlled by the potentiometer 226.

The tube 114 is in the plate circuit of the tube 112. The tube 114 assumes a pulsating conducting function, due to the condenser 252. When the latter is discharged, an opposing bias is imposed on the tube and the latter is rendered non-conducting. After the condenser 252 is discharged, the tube 112 again conducts, and voltage is imposed on the primary 148 of the transformer 146. This is put in circuit with the secondary 116 of the transformer 16. The voltage thus imposed on the primary 148 imposes voltage on the secondaries 150 and 152 and on the grids of the tubes 104 and 106, which is positive and in opposition to and of greater value than the negative bias imposed by the secondaries 134 and 136. When the tubes 104 and 106 become conducting, as they do when the positive bias is thus imposed thereon, a circuit is established through the primary of the transformer 146 and the latter forms a holding circuit for maintaining the tubes in conducting condition. While the condenser 218 is charging, it opposes the positive bias of 226 and prevents the tube 108 from conducting. Also, while the tubes 104 and 106 are conducting, the filament of the tube 110 assumes the same potential as the plate, and conduction through this tube therefore ceases. As a consequence, the condenser 218 no longer charges and it ceases to impose any negative bias on the tube 108, and due to the conduction of the tube 108 by reason of the positive bias imposed through the potentiometer 226, the tube 108 is placed in a circuit shorting the primary 148 of the transformer 146. While the tubes 104 and 106 are conducting, circuit is completed to the rectifier 42 from the secondary 116 of the transformer 16. This circuit is established and held through the interval of the pulse delivered as just described and during that interval a pulse of direct current is transmitted from the rectifier 42 through the conductors 44 and 56 to the switch means associated therewith described above. While this pulse is maintained, the switch means is held in the position it happened to be assuming at the time and upon the occurrence of the cessation of that pulse and the transmission of a succeeding pulse, the switch means is actuated to the alternate one of the two positions, for reversing the polarity of the direct current imposed on the magnetic chuck 10. This operation continues until the cycle is completed due to the diminishing intervals of reversal of the cyle. Each pulse is of a succeedingly shorter duration than the preceding one due to the interaction of the condensers, each being charged pursuant to discharge of the other which renders the circuit conducting in which the condenser in question is being charged.

This interaction results in each condenser providing the conducting circuit for charging the other condenser. The length of the intervals making up the cycle is determined by the adjustable resistances or potentiometers 194, 226, 214 and 250.

The demagnetizing effect is accomplished by successively and progressively reducing the intervals in which the polarity of the direct current is reversed, while maintaining the value of the voltage thereof constant.

The power supply is of low impedance and a minimum time for saturating the magnetic chuck is required. Complete saturation can be effected rapidly, and saturation to the extent desired to the value less than the previous saturation in the opposite direction may be effected rapidly with a rapid total period for de-magnetization. From a practical standpoint the time between reversals is nil and the demagnetizing cycle of the apparatus of the present invention requires essentially one half the time required for previously known demagnetizing cycles.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

I claim:

1. Apparatus for demagnetizing an electromagnet comprising a source of alternating current, rectifying means for converting the alternating current to direct current and delivering it to the electromagnet, switch means for reversing the polarity of the direct current, electromagnets for operating said switch means, second circuit means for controlling the operating electromagnets, first electronic tube means in the second circuit means, second electronic tube means for controlling the conductivity of the first electronic tube means, and means for pulsing the second tube means and thereby rendering the first tube means pulsatingly conductive for actuating the reversing means in a series of successively diminishing time intervals and successively decreasing the residual magnetism on the electromagnet.

2. Apparatus for demagnetizing an electromagnet comprising circuit means including a source of alternating current and the electromagnet to be demagnetized, rectifying means for converting the alternating current to direct current and delivering it to the electromagnet, first switch means for interrupting the alternating current, second switch means for reversing the polarity of the direct current imposed on the electromagnet, solenoids for actuating said switch means, second circuit means connected with said source of alternating current, second rectifying means in said second circuit means for converting alternating current to direct current and delivering it to said solenoids, electronic tube means in said second circuit means for controlling the conductivity thereof, and means for pulsing said tube means for rendering said second circuit means alternately conducting and non-conducting in successively diminishing time intervals throughout a predetermined cycle.

3. Apparatus for demagnetizing an electromagnet comprising circuit means including a source of alternating current and the electromagnet to be demagnetized, rectifying means for converting the alternating current to direct current and delivering it to the electromagnet, first switch means for interrupting the alternating current, second switch means for reversing the polarity of the direct current imposed on the electromagnet, solenoids for actuating said switch means, second circuit means connected with said source of alternating current, second rectifying means in said second circuit means for converting alternating current to direct current and delivering it to said solenoids, electronic tube means in said second circuit means for controlling the conductivity thereof, including mutually inverted tubes, and second electronic tube means for imposing conducting bias on the first tubes in successively diminishing time intervals throughout a predetermined cycle.

4. Apparatus for demagnetizing an electromagnet comprising first circuit means including a source of alternating current and the electromagnet to be demagnetized, means in said first circuit means for converting the alternating current to direct current and delivering it to the electromagnet, switch means in said circuit means for alternately reversing the polarity of the direct current, said switch means having a stable position in each of opposite reversing attitudes, second circuit means separate from said first circuit means including control means for reversing the switch means from the position it happens to assume, and means including electronic tube means for controlling said control means.

5. Apparatus for demagnetizing an electromagnet comprising first circuit means including a source of alternating current and the electromagnet to be demagnetized, means for converting the alternating current to direct current and delivering it to the electromagnet, means for interrupting the alternating current, means for reversing the polarity of the direct current while the alternating current is interrupted, and control means for actuating the reversing means including a first and a second electronic tube, means constantly imposing a negative non-conductive bias on the first tube, a condenser in circuit with the first tube, second circuit means including a source of direct current for charging the condenser for thereafter discharging and imposing a positive conducting bias on the tube, a condenser in circuit with the second tube, and third circuit means controlled by the first tube for charging the second condenser for discharge thereof and rendering the second tube conductive, whereby the control means operates to actuate the reversing means at successively decreasing intervals throughout a predetermined period.

6. Apparatus for demagnetizing an electromagnet comprising circuit means including a source of alternating current and the electromagnet to be demagnetized, full wave rectifying means for converting the alternating current to direct current and circuit means for delivering the direct current to the electromagnet, means for interrupting the alternating current, means for reversing the polarity of the direct current while the alternating current is interrupted, and electronic tube means operative for actuating said interrupting and reversing means through a cycle of successively diminishing time intervals and thereby successively decreasing the residual magnetism of the electromagnet.

7. The apparatus set out in claim 6 including means for maintaining the voltage of the current source constant throughout the interrupting and reversing cycle.

8. The apparatus set out in claim 6 including switch means for controlling said interrupting and reversing means, and electromagnets for operating the switch means, and in which the electronic tube means controls current pulses for actuating the electromagnets.

9. Apparatus for demagnetizing an electromagnet comprising a first circuit portion including an alternating current source and the electromagnet to be demagnetized, means for converting the alternating current to direct current and delivering it to the eelctromagnet, means for reversing the polarity of the direct current while the alternating current is interrupted, a second circuit portion for controlling the interrupting and reversing means, electronic tube means in said second circuit portion for controlling the eenrgization thereof, and means for controlling the bias on said tube means including circuit means and condenser means therein for imposing pulses at intervals on the tube means and thereby rendering the first circuit means periodically and alternately conductive and non-conductive.

10. The apparatus set out in claim 9 in which means is provided for normally imposing a non-conducting bias on the tube means including a source of direct current and a condenser for imposing pulsating conducting bias on the tube means.

11. The apparatus set out in claim 2 in which means is provided for adjusting the length of the time intervals.

12. The apparatus set out in claim 2 in which means is provided for adjusting the length of the periods between said intervals.

13. The apparatus set out in claim 9 in which the tube means includes a pair of normally non-conducting tubes, and which includes a condenser for each tube, means for charging one of the condensers for discharging through its tube to render it conductive, the second tube being controlled by the first tube, whereby the circuit means operates to actuate the reversing means at successively decreasing intervals throughout a predetermined period.

References Cited in the file of this patent

UNITED STATES PATENTS

| 2,529,198 | Storm | Nov. 7, 1950 |
| 2,544,366 | Storm | Mar. 6, 1951 |
| 2,786,970 | Connoy | Mar. 26, 1957 |